United States Patent

[11] 3,600,012

[72] Inventor Warren J. Stafford
 Peoria, Ill.
[21] Appl. No. 855,868
[22] Filed Sept. 8, 1969
[45] Patented Aug. 17, 1971
[73] Assignee Caterpillar Tractor Co.
 Peoria, Ill.

[54] HOLE BISECTED FOUR-BOLT SPLIT FLANGE CONNECTOR
 1 Claim, 3 Drawing Figs.

[52] U.S. Cl. .................................................. 285/413
[51] Int. Cl. .................................................. F16l 23/00
[50] Field of Search .................................... 285/415, 414, 413, 158, 368

[56] References Cited
 UNITED STATES PATENTS
 2,408,960 10/1946 Stivason .................... 285/368 X

| | | | |
|---|---|---|---|
| 2,681,817 | 6/1954 | Demlow .................... | 285/368 X |
| 3,343,604 | 9/1967 | Wemer ...................... | 285/415 X |
| 3,515,416 | 6/1970 | Pickert ...................... | 285/368 X |

FOREIGN PATENTS

| 55,430 | 1/1952 | France ...................... | 285/413 |
| 6,709 | 5/1886 | Great Britain ............. | 285/415 |

Primary Examiner—Thomas F. Callaghan
Attorney—Fryer, Tjensvold, Feix, Phillips & Lempio ABSTRACT: A four-bolt split flange connector for assembling fluid couplings to associated structures is diagonally bisected through two of its four bolt holes and its center so that each of the identical arcuate flange sectors includes a centrally disposed bolt hole and two half holes at its ends which join with those of the other sector to form four bolt holes. Thus, each of the sectors is secured with three bolts of the four attaching bolts when, for securing a coupling to associated structures, operating at high pressures.

PATENTED AUG 17 1971

3,600,012

INVENTOR
WARREN J. STAFFORD

BY Freyer, Tjensvold, Feix, Phillips & Lempio
ATTORNEYS

HOLE BISECTED FOUR-BOLT SPLIT FLANGE CONNECTOR

BACKGROUND OF THE INVENTION

Split flange connectors have often been employed to join couplings to blocks, manifolds, etc. for establishing fluid communication where it is difficult or costly to employ continuous circular flanges which, by necessity, must be permanently associated with the fluid coupling. In the latter case, the cost of the replacement assemblies is increased due to the incorporation of the flange on the coupling itself. Thus, split flange connectors are often used to secure the coupling of high pressure hydraulic hose assemblies, equipped with such couplings at each end, to associated structures. U.S. Pat. No. 2,681,817 issued to Demlow illustrates one type of split flange connector that has had wide acceptance in the earthmoving industry for connecting the coupling of flexible high hydraulic hose assemblies with their associated components, such as valves, hydraulic cylinders and the like.

A current trend in hydraulic engineering, especially in the earthworking machinery, is toward higher service pressure in hydraulic circuits so that the size of the individual hydraulic actuating component can be reduced without a loss of available force. As a result, it is not uncommon to find hydraulic circuits in earthmoving machinery operating at service pressures in the range of 3,000 p.s.i. to 5,000 p.s.i. wherein the pressure surges about 10,000 p.s.i. are often encountered.

As higher hydraulic pressures are incorporated in hydraulic circuits, the split flange connectors which are employed to attach the couplings to their associated structures are required to withstand increased pressures and loads. For example, a 1½-inch internal diameter hose coupling, during a pressure surge peaking at 10,000 p.s.i., will require the split flange connector to restrain a force of magnitude of 15,000 pounds or greater which acts to separate the coupling from its associated structure. As a result, couplings attached with conventional split flange connectors are prone to fail or leak as a result of the distortion of the flange and coupling from these high loadings in such circuits.

Current commercially available flanges are not suitable for employment at these higher pressures without extensive redesign for utilizaton in high-pressure circuits. Such redesign could involve increasing the cross section of the flange segments or increasing the number of bolt holes in each segment in order to lessen the distortion or prevent failure caused by the higher pressures, especially during pressure surges. While the increase of cross-sectional area or increasing the number of bolts or using both techniques in combination will tend to improve the capability of conventional split flanges, limited space and access often require other solutions for an acceptable split flange connector for high-pressure operation. Similarly, split flange connectors which have overlapping segments to aid in load distribution, such as the pipe flange illustrated in U.S. Pat. No. 2,683,613 issued to Streed, et al., has not proved economically acceptable for such use due to their complex fabrication requirements and an inability to uniformly distribute the high-loading factor without very careful machining and large cross-sectional requirements.

Thus, it is an object of this invention to provide an improved four-bolt flange connector which is suitable for high-pressure operation.

Another object is to provide a split flange connector which can be serviced by loosening three bolts and removing one thereby facilitating the assembly and disassembly of couplings therewith.

A further object of this invention is to provide a four-bolt split flange connector wherein each sector is restrained by three bolts of the four attaching bolts for improved load distribution and to lessen distortion caused by high-pressure operation.

Also, it is an object to provide an improved, high-pressure, four-bolt split flange which is inexpensive.

SUMMARY OF THE INVENTION

An improved split flange connector for connecting high-pressure fluid couplings to associated hydraulic components utilizing only four attaching bolts comprises a disc-shaped flange having a central aperture and four bolt holes, said bolt holes disposed in spaced relationship in a circumferential pattern about the central aperture of the flange and said bolt holes having their axes parallel with the central axis of the central aperture, said disc-shaped flange diametrically bisected through its center and the axes of two of its four bolt holes to divide said disc-shaped flange into two identical arcuate sectors, each of said sectors having a central bolt hole and two half holes at its opposite ends, each sector also having a semicircular recess about its inner periphery forming a stepped wall for engagement with a coupling, and four attaching bolts whereby two of such sectors can be assembled with a high-pressure fluid coupling to attach it to an associated component wherein three of said attaching bolts will secure each of said sectors of the split flange.

BRIEF DESCRIPTION OF THE INVENTION

Figure 1:
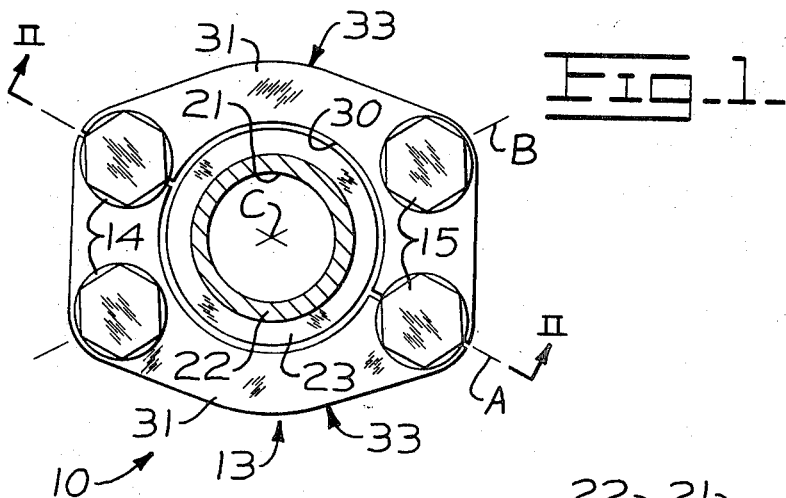
FIG. 1 is a plan view of the novel split flange connector with its attaching bolts in place assembled with a high-pressure fluid coupling.
Figure 2:
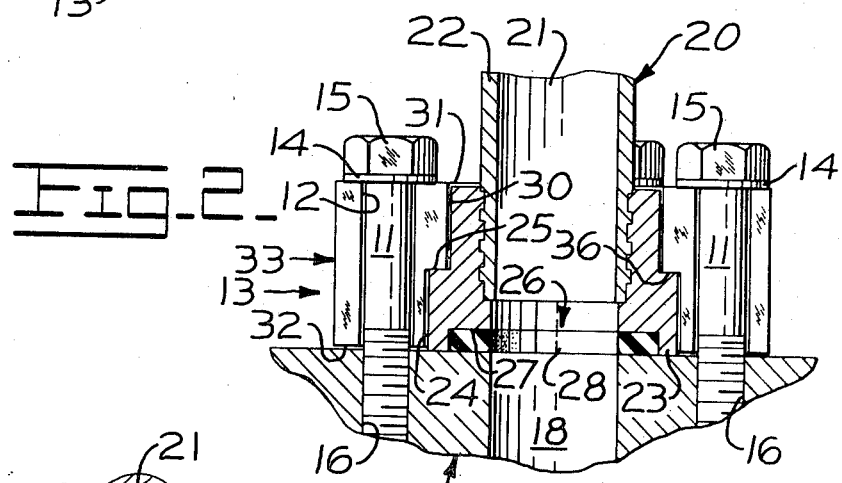
FIG. 2 is a section along line 2—2 of FIG. 1 (line 2—2 is coincident with diametric line A—A)

Referring to FIG. 1 the novel split flange connector is shown with its four attaching bolts 11 inserted in holes 12 of the circular flange 13. Normally washers 14 will be employed under the heads 15 of the attaching bolts as illustrated in FIGS. 1 and 2; however, in FIG. 3 the washers 14 are not employed. The attaching bolts are normally screwed into threaded holes 16 in the structure of a hydraulic component 17, such as a hydraulic motor manifold, pump, valve body, or the like with which the coupling will be employed to secure a high-pressure coupling thereon. Such a hydraulic component will include a port 18, shown in FIG. 2, through which the hydraulic component is connected with the coupling and is in communication to establish fluid communication.

Threaded holes 16 are spaced circumferentially about the port 18 in the structure of the hydraulic component 17 and the split flange connector is employed to secure a high-pressure coupling 20 to the hydraulic component so that its passage 21 registers with the port 18 in the component. A high-pressure coupling conventionally includes a tube portion 22 which is attached to a circular head 23, such as mechanical expansion of the tube wall into a grooved wall of the head in the portion where the tube and the head are telescoped together. Such a joint is illustrated in the drawings. Obviously, this tube portion can be attached to the head by numerous other methods, such as welding, and normally will be part of the coupling connection to hydraulic hose or high-pressure metal tubing such as employed in earthworking machinery.

Conventionally, the head 23 of the coupling will include a radially extending flange 24 at its outboard end forming a shoulder 25 which is a circular bearing surface through which a split flange connector engages the head to urge it tightly against the surface on the hydraulic component 17 to which the coupling is secured with a flange. The mouth 26 in the head includes a groove 27 in which an O-ring 28 is received for effecting a fluid seal when the O-ring is compressed between the abutting surface of the hydraulic component and the base of the groove in the head as the head is brought into engagement with the hydraulic component by tightening the bolts of the split flange connector.

The design of the flange 13 of split flange connector 10 is important to achieve the desired results. Generally, the flange is circular or oval shaped with a central aperture 30 for receiving the head 23 of the high-pressure coupling 20. In the plan view illustrated in FIG. 1, it can be seen that the four attaching bolts 11 have the axes of their holes 12 located on one or the other of the crossed diametric lines A and B passing through the center of C of aperture 30 which is also in the center of the coupling. These diametric lines should be within 40° of being perpendicular of one another for best load distribution and less distortion, depending on space considerations. A preferred relationship between these diametric lines will be in the range of 35° of being perpendicular of one another. The bolt holes 12 extending through the flange will be disposed in the flange circumferentially about the aperture and of course on the diametric lines as indicated. Further, these bolt holes will have their axes oriented parallel to the axes of the aperture 30, so that they open on the top surface 31 and bottom surface 32 of the disc-shaped flange.

The disc-shaped flange is bisected along one of the diametric lines A or B and in FIG. 1 diametric line A represents the bisecting plane. The flange can be made as a unitary structure and after the aperture 30 has been formed, along with bolt holes 12, it can be cut along diametric line A to split the flange into two identical arcuate segments 33 each having a central bolt hole 12 and two half holes which are located at its opposite ends 34 so that four bolt holes will be formed when two of these segments are assembled together with their half bolt holes registered with one another. Through this arrangement, it can be appreciated that three of the four attaching bolts 11 will always be in engagement with each arcuate sector 33 to secure it to the attaching structure, and thereby, tightly clamp the high-pressure coupling 20 to its associated hydraulic component.

Figure 3:
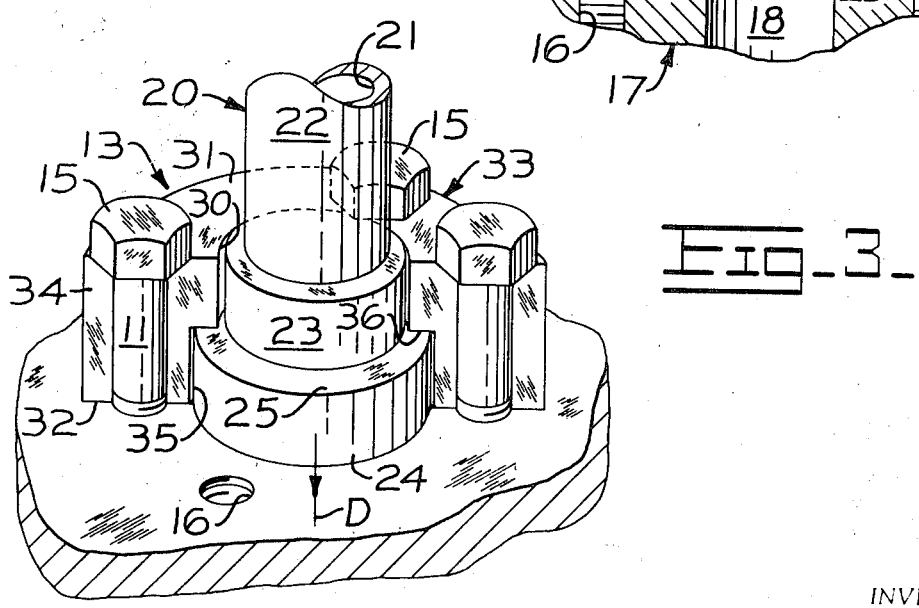
FIG. 3 is a perspective illustrating one sector of the split flange connector attached to a hydraulic component and with three of the four attaching bolts illustrating how the fluid couplings can be removed or assembled with three of the four bolts in place.

The head 23 of the high-pressure coupling can be easily removed from a sector 33 while this sector is still secured with three loose bolts 11 to an associated hydraulic component by moving it in a direction of arrow D shown in FIG. 3. Thus, it can be appreciated that it is only necessary to remove one attaching bolt and loosen the other three to allow one of the arcuate sectors to be removed for servicing or replacing high-pressure coupling attached with e novel split flange connector.

Each of the arcuate sectors 33 includes a semicircular recess 35 extending from its bottom surface 32 about its inner circular periphery (one half of aperture 30) to its central portion thereby affecting a stepped wall and forming a bearing surface 36 which abuttingly engages approximately one-half of the circular bearing surface 25 of the head 23 of the high-pressure coupling when a sector is engaged or assembled therewith. The distance from bearing surface 36 of each sector to its bottom surface 32 is less than the thickness of flange 24, or flange 24 and spacers that may be employed, so that the clamping action of the attaching bolts will always act through the head of the coupling rather than on the bottom surface of the connecting flange. This space differential is illustrated in FIG. 2.

Normally, all of the bolts 11 fit in bolt holes 12 in a closely fitted relationship so that when a sector is retained by two or more bolts 11 as illustrated in FIG. 3 there will be no tendency of the sector to pivot around its single central attaching bolt hole. Also, the aperture 30 formed when two of the arcuate sectors 33 are assembled with one another, as well as the walls of groove 35, are closely fitted to the head so that it will not tend to move laterally or vibrate within the coupling to any appreciable degree.

From the above description, it will be apparent that the four attaching bolts 11 are positioned circumferentially about the sector for excellent load distribution and that the individual sectors are not weakened by the incorporation of more than one full bolt hole in each sector. As a result of maintaining the structural integrity of each sector, smaller flange sizes (cross-sectional areas) can be employed without distortion and leakage commonly experienced in conventional split flange connectors. Further, there are no cantilevered end portions on either sector which is quite conventional in current four-bolt flange connectors. As a result, the new split flange connector is less likely to tip or tilt under high-pressure loadings since no pivoting of the sectors occurs due to the three point attachment. This tilting or tipping can occur in the conventional four-bolt split flange since only two attaching bolts in each sector are available for securing the sector and the sector can rock about an axis extending through them. However, a triangular, three-bolt attachment is achieved for each sector in the instant split flange connector.

Wherein the above Specification has referred to four attaching bolts it should be appreciated that this terminology is meant to include studs with washers and nuts which are equivalent to the bolts with the enlarged head portion. Thus, where attaching bolts are referred to in the Specification and claims, applicant means to include studs with nuts as being encompassed to this terminology.

I claim:

1. An improved split flange connector for assembling high-pressure fluid couplings on associated hydraulic components comprising:

a flat disc-shaped flange of uniform thickness having a central aperture and four attaching bolt holes circumferentially disposed about said aperture in its central portion, said bolt holes located so that diametrically opposite bolt holes have their axes located on one or the other of two intersecting diametric lines passing through the center of said disc-shaped flange, said disc-shaped flange also bisected along one of said diametric lines dividing said disc-shaped flange into two identical arcuate sectors, each of said sectors having a central bolt hole and two half holes at its opposite ends whereby assembly of like sectors will form a flange with four bolt holes, said diametric lines being within 40° of being perpendicular and located so said central bolt holes are asymmetric to the other bolt holes, a counter bore milled in said disc-shaped flange forming in each sector a central internal stepped arcuate wall for cooperating with a bearing surface of a head of a high-pressure fluid coupling to be secured, and four attaching bolts having a head portion larger than its associated bolt hole for attaching each of said sectors with three of the four bolts when assembled on a component structure to which said high-pressure coupling is to be secured, said attaching bolts sized closely to said bolt holes to limit motion of said sectors when assembled on said component structure.